(12) United States Patent
Miller

(10) Patent No.: US 7,077,990 B2
(45) Date of Patent: Jul. 18, 2006

(54) HIGH-DENSITY, THERMALLY-CONDUCTIVE PLASTIC COMPOSITIONS FOR ENCAPSULATING MOTORS

(75) Inventor: James Miller, Marietta, GA (US)

(73) Assignee: Cool Options, Inc., Warwick, RI (US)

( * ) Notice: Subject to any disclaimer, the term of this patent is extended or adjusted under 35 U.S.C. 154(b) by 300 days.

(21) Appl. No.: 10/607,352

(22) Filed: Jun. 26, 2003

(65) Prior Publication Data

US 2004/0031141 A1 Feb. 19, 2004

Related U.S. Application Data

(60) Provisional application No. 60/391,744, filed on Jun. 26, 2002.

(51) Int. Cl.
*B29C 70/70* (2006.01)
*B29C 70/88* (2006.01)

(52) U.S. Cl. .............................. 264/272.2; 264/272.19; 29/596; 29/732

(58) Field of Classification Search ........... 264/272.15, 264/272.19, 272.2; 310/179; 29/596, 732, 29/607
See application file for complete search history.

(56) References Cited

U.S. PATENT DOCUMENTS

| | | | | |
|---|---|---|---|---|
| 5,091,135 A | * | 2/1992 | Okada et al. ........... 264/272.13 |
| 5,338,602 A | * | 8/1994 | Sheer et al. ................. 428/323 |
| 5,344,795 A | * | 9/1994 | Hashemi et al. ........ 264/272.15 |
| 5,419,864 A | * | 5/1995 | Sheer et al. ................. 264/254 |
| 5,524,334 A | * | 6/1996 | Boesel ......................... 29/605 |
| 5,627,107 A | * | 5/1997 | Howard .................. 264/272.17 |
| 5,672,927 A | | 9/1997 | Viskochil .................... 310/194 |
| 5,806,169 A | | 9/1998 | Trago et al. .................. 29/596 |
| 6,136,250 A | * | 10/2000 | Brown ..................... 264/272.2 |
| 6,362,554 B1 | * | 3/2002 | Neal ........................... 310/254 |
| 6,414,398 B1 | * | 7/2002 | Wolf ........................... 257/795 |
| 6,680,015 B1 | * | 1/2004 | McCullough ............... 264/105 |
| 6,685,855 B1 | * | 2/2004 | Miller et al. ................. 264/1.1 |
| 6,794,035 B1 | * | 9/2004 | Tobita et al. ................ 428/402 |
| 2002/0089241 A1 | * | 7/2002 | Du ............................. 310/43 |
| 2002/0148100 A1 | * | 10/2002 | Du ............................. 29/597 |
| 2003/0071382 A1 | * | 4/2003 | Neal ......................... 264/40.5 |

FOREIGN PATENT DOCUMENTS

EP 0 327 338 * 8/1989

\* cited by examiner

*Primary Examiner*—Angela Ortiz
(74) *Attorney, Agent, or Firm*—Barlow, Josephs & Holmes, Ltd.

(57) ABSTRACT

A method for making a stator assembly having a thermally-conductive, plastic housing for a high speed motor is provided. A thermally-conductive, high-density polymer composition is used to make the housing, and the stator is uniformly encapsulated therein. The polymer composition comprises a base polymer matrix such as polyphenylene sulfide, and a thermally-conductive, high-density filler material such as zinc oxide.

9 Claims, 2 Drawing Sheets

HIGH-DENSITY, THERMALLY-CONDUCTIVE PLASTIC COMPOSITIONS FOR ENCAPSULATING MOTORS

CROSS-REFERENCE TO RELATED APPLICATIONS

This application claims the benefit of U.S. Provisional Application No. 60/391,744 having a filing date of Jun. 26, 2002, the entire contents of which are hereby incorporated by reference.

BACKGROUND OF THE INVENTION

The present invention generally relates to polymer compositions having high thermal conductivity and high density. The polymer composition can be used to make a thermally-conductive housing for electrical motors having a rotor and stator assembly.

High speed motors are well known and used in many different applications. For example, high speed motors having a rotor and stator assembly are used in home appliances, industrial equipment, and computer disc drives. The components of the motor must be kept clean from contaminating particles and other foreign matter that can interfere with their operation. One method for protecting such motors involves encapsulating or overmolding the motor with a plastic composition. For example, a plastic resin such as a polycarbonate, polystyrene, styrene copolymer, polyolefin, acrylate, acrylic, polyvinyl chloride, polyester, or polyamide resin can be used to encapsulate the motor. Such conventional plastic compositions are generally effective in protecting the components of the motor from hazardous environmental conditions such as exposure to corrosive fluids, contamination from dirt and dust particles, and other materials. Also, such compositions are good electrical insulators. Further, plastic compositions can be used to improve the mechanical integrity and other properties of the motor assembly. However, conventional plastic compositions have some drawbacks.

Particularly, the motor can generate a substantial amount of heat that must be removed in order for the device to function properly. If the heat is not efficiently dissipated, the motor can overheat, and the device can break-down. Conventional plastic compositions generally are good thermal insulators. These compositions are inefficient for removing heat and cooling the motor.

To address this problem, plastic compositions having improved thermally conductive properties have been developed. Neal, U.S. Pat. No. 6,362,554 discloses a method of encapsulating a high speed spindle motor that includes a core and a stator having multiple conductors. These conductors create magnetic fields as they conduct electrical current. A thermally-conductive body encapsulates the stator. The '554 Patent discloses that a thermally-conductive, but non-electrically-conductive, plastic composition including ceramic filler particles can be used to form the encapsulating body. According to the '554 Patent, a preferred form of plastic is polyphenyl sulfide, and the amount of glass, "Kevlar", carbon or other fibers in the material can be varied. The '554 Patent also discloses that the amount of ceramic material in the material can be varied.

Although such thermally-conductive, plastic compositions can be somewhat effective in transferring heat away from the motor assembly, there is a need for an improved composition that can help with motor balancing problems. This problem can occur in high speed motors having a rotor and stator assembly. The stator includes a magnetically-inducible core having poles extending therefrom. Copper wire windings are wound around the poles and serve as conductors. The copper wire windings create magnetic fields in the core as the windings conduct electrical current. The motor further includes a rotor shaft which is connected to a hub and surrounded by bearings. The magnetic field interacts with the rotor shaft and hub causing these pieces to rotate.

One problem with the winding of the copper wire around the poles is that the winding pattern can be non-uniform and this leads to balancing problems. The non-uniform winding problem is particularly pronounced in the outermost wraps (traverses) of the wound wire. This uneven distribution of the windings can cause vibrations as the shaft and hub rotate. As a result, manufacturers often add or remove material to balance the motor assembly and dampen the vibration. This time-consuming machining method of balancing the assembly can be costly.

It would be desirable to have a thermally-conductive, plastic composition that could be used to encapsulate the stator assembly uniformly so that these machining and balancing steps could be eliminated. The composition should have good heat-conduction properties so that it can dissipate heat from the motor assembly quickly and efficiently. The composition should also be relatively dense and capable of uniformly encapsulating and balancing the motor.

The present invention provides such a thermally-conductive, plastic composition. These and other objects, features, and advantages of this invention are evident from the following description and attached figures.

SUMMARY OF THE INVENTION

The present invention relates to a method for making a stator assembly having a thermally-conductive, plastic housing. A thermally-conductive polymer composition is used to make the housing, and the stator is uniformly encapsulated therein.

The thermally-conductive polymer composition of this invention generally comprises: a) about 20% to about 80% by weight of a polymer matrix, and b) about 30% to about 80% by weight of a thermally-conductive material, wherein the thermally-conductive material has a density of at least about 4.0 g/cc, and the total polymer composition has a density of at least about 2.5 g/cc. Preferably, the polymer composition has a thermal conductivity of at least about 0.6 W/m° K., and more preferably greater than 1 W/m° K.

The polymer composition may further comprise about 3% to about 25% by weight of a reinforcing material. The polymer matrix of the composition can be a thermoplastic or thermosetting polymer. For example, polyphenylene sulfide or an injection-moldable fluoropolymer can be used to form the polymer matrix. The reinforcing material can be glass, inorganic minerals, or other suitable material which strengthens the polymer matrix.

In the method of the current invention, a molten polymer composition is provided, and the composition is injected into a mold to form a molded housing that uniformly encapsulates a stator assembly for a motor.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawing in which:

DETAILED DESCRIPTION OF THE PREFERRED EMBODIMENTS

The present invention relates to a method for making a stator assembly having a thermally-conductive, plastic housing. A polymer composition comprising a base polymer matrix and a thermally-conductive, electrically-insulating material is used to make the plastic housing.

Figure 1:
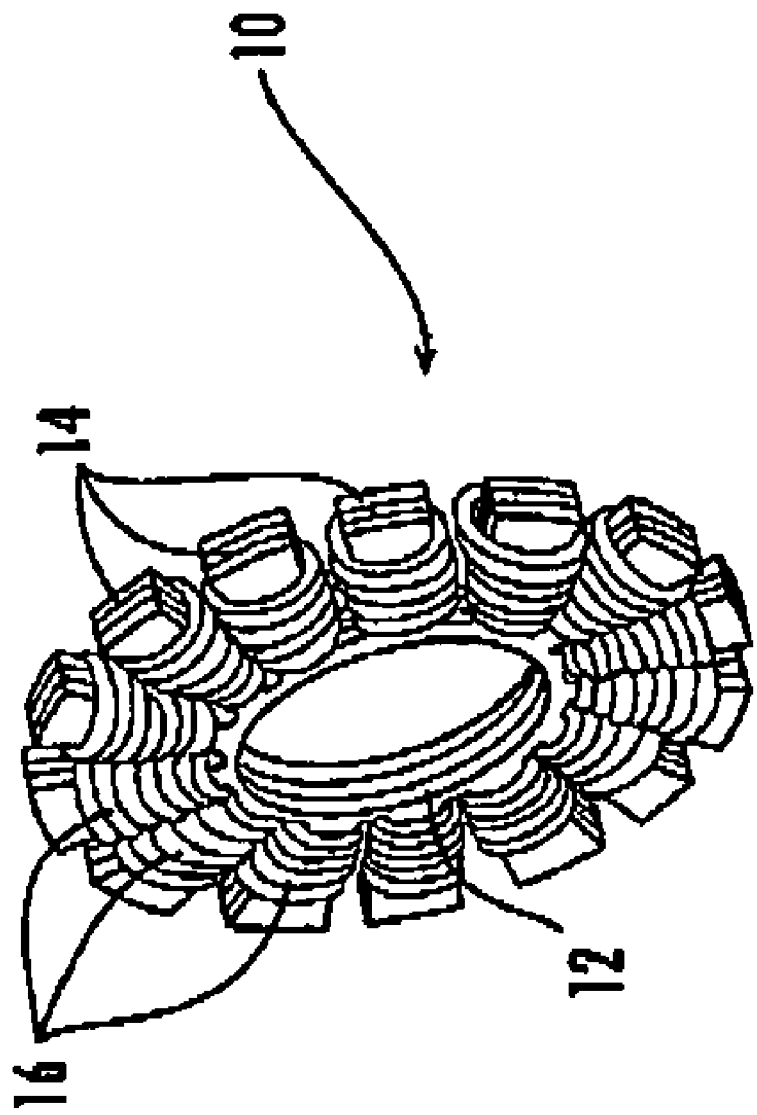
FIG. 1 is a perspective view of a conventional stator assembly which can be used in accordance with the present invention.

Referring to FIG. 1, a conventional stator for a motor is shown. The stator is generally indicated at 10. The stator 10 includes a magnetically-inducible core 12 having multiple poles 14 extending therefrom. Wire windings 16, which are typically made from copper, are wound around the poles 14 and function as electrical conductors. The copper wire typically has a density in the range of about 7 g/cc to about 9 g/cc depending on the wire gauge. Generally, pure copper wire is considered to have a density of about 8.9 g/cc. Copper alloys may have greater or lesser densities. The wire conductors 16 create a magnetic field in the core 12 as they conduct electrical current.

Figure 2:
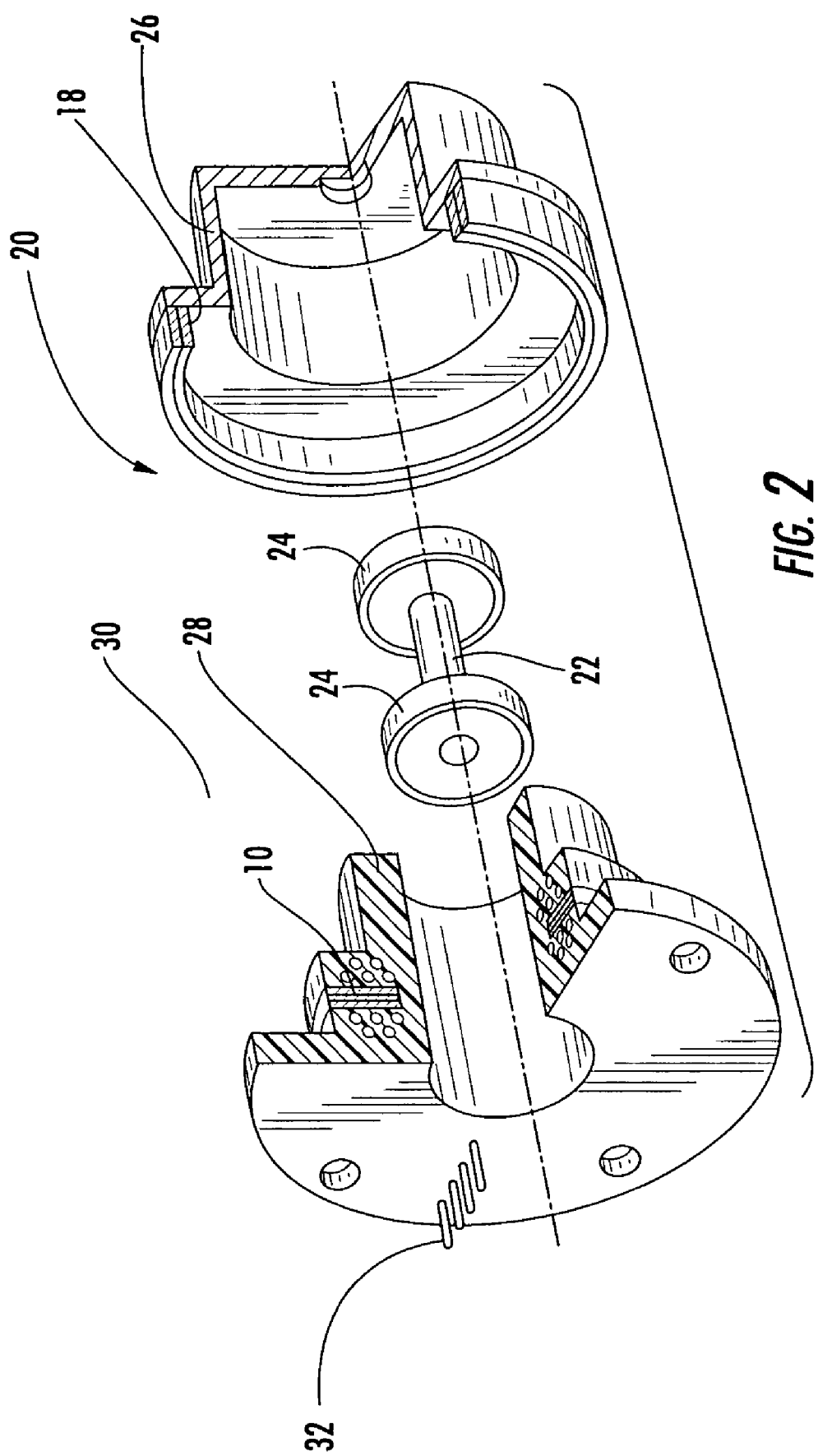
FIG. 2 is a perspective view of a high speed motor having a rotor and stator assembly showing the molded body encapsulating the stator in accordance with the present invention.

As shown in FIG. 2, the stator 10 can be used to construct a high speed motor which is generally indicated at 20. The motor 20 includes a rotor shaft 22, bearings 24, and a hub 26. A magnet 18 may be fixed to the inside of the hub 26. The motor 20 further includes a housing 28, where the stator 10 is embedded therein per the present invention. The stator assembly 30 comprises the embedded stator 10 and the thermally-conductive housing 28. The stator assembly 30 may further contain electrical connectors 32. The motor operates in a conventional manner.

The present invention provides a method for making a stator assembly 30 having a thermally-conductive housing 28. A polymer composition comprising a base polymer matrix and a thermally-conductive, electrically-insulating material is used to make the thermally-conductive housing 28.

A thermoplastic polymer can be used to form the polymer matrix of the composition. For example, the thermoplastic polymer can be selected from the group consisting of polycarbonates, polyethylene, polypropylene, acrylics, vinyls, injection moldable fluoropolymers (PFA), polyamides, polyesters, polysulfones, polyphenylene sulfide, liquid crystal polymers, such as thermoplastic aromatic polyesters, polyetherimides, polyamidimides, and blends thereof. Polyphenylene sulfide is a particularly preferred thermoplastic polymer. Alternatively, thermosetting polymers such as elastomers, epoxies, polyimides, silicones, and polyurethanes can be used. Generally, the polymer matrix comprises about 20 to about 80% by weight of the total composition and more particularly about 40 to about 80% by weight of the composition.

In the present invention, thermally-conductive, electrically-insulating materials are added to the polymer matrix. These materials impart thermal conductivity to the non-conductive polymeric matrix and have good electrical-insulation properties. Generally, the thermally-conductive, electrically-insulating materials comprise about 30 to about 80% by weight of the total composition and more particularly about 50 to about 70% by weight of the composition.

In the present invention, it is important that a relatively dense thermally-conductive material be used in the composition. Particularly, it is important that the material has a density of at least about 4.0 g/cc so that the resulting polymer composition has a density of at least about 2.5 g/cc, and a thermal conductivity of at least about 0.6 W/m° K. Suitable filler materials include, for example, zinc oxide having a density of about 5.7 g/cc, copper oxide having a density of about 7.3 g/cc, antimony oxide having a density of about 5.6 g/cc, magnesium oxide having a density of about 5.0 g/cc, and tin oxide having a density of about 6.7 g/cc.

The density of the overall polymer composition is significant. As discussed above, the copper wire windings on the stator typically have a density in the range of about 7.0 g/cc to about 9.0 g/cc, and pure copper wire is generally considered to have a density of about 8.9 g/cc. When, these copper wire windings are wound around the stator poles, interstitial spaces or air gaps are formed. These gaps can occur, because the windings are wrapped around the poles in an asymmetrical pattern. This poor balancing can lead to motor vibration and other related problems. It has been found that by minimizing the differential density between the polymer composition density ("the encapsulation density") and the wire density, a good balancing effect can be obtained and these vibration problems can be reduced.

The density of the polymer composition ("the encapsulation density") and the wire density can be calculated per conventional means. As discussed above, in the present invention, it is preferred that the polymer composition have a density of at least about 2.5 g/cc. Thus, the difference between the wire density and encapsulation density ("i.e., the differential density") can be calculated. Preferably, the differential density is less than about 6.4 g/cc.

The thermally-conductive, electrically-insulating material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size up to about 500 microns. As another example, the fibers can have a length up to about 3 millimeters.

An optional reinforcing material can be added to the polymer matrix. The reinforcing material can be glass, inorganic minerals, or other suitable strengthening material. The reinforcing material strengthens the polymer matrix. The reinforcing material, if added, constitutes about 3% to about 25% by weight of the composition.

Further, it has been found that electrically-conductive materials in small amounts (about 5% to about 10% based) based on weight of composition can be added to the polymer composition in order to increase density. However, it is important that the total electrical resistivity of the composition be kept at $1 \times 10^{12}$ ohm-cm or greater. For example, tungsten, tungsten carbide, or other forms of tungsten can be added. It is preferred that carbon materials not be added, because these materials can lower the density of the composition.

In one embodiment, the polymer composition of this invention comprises about 30 weight % polyphenylene sulfide (PPS), about 60 weight % zinc oxide particles, and about 10 weight % reinforcing chopped glass based on the weight of the composition to provide a composition having a density of about 2.8 g/cc. In one embodiment, the polymer composition of this invention comprises about 30 weight % polyphenylene sulfide (PPS), and about 70 weight % zinc oxide particles to provide a composition having a density of about 2.9 g/cc.

The thermally-conductive material and optional reinforcing material are intimately mixed and dispersed within the non-conductive polymer matrix to form the polymer composition. If desired, the mixture may contain additives such as, for example, antioxidants, plasticizers, dispersing aids, and mold-releasing agents. The mixture can be prepared using techniques known in the art.

In accordance with this invention, the resulting composite mixture can be shaped into a housing which substantially encapsulates the stator using an injection or insert molding process. In the insert molding process, the stator is placed within the mold for the housing. The molten polymer composition is injected into the mold so that the composition surrounds and is disposed about the stator. It should be recognized that it is not necessary for the molten composition to completely encapsulate the stator. Some minor surfaces of the stator may remain exposed. However, it is important that the molten composition uniformly surround the stator so that the composition mass is evenly distributed. In this manner, the molten composition forms a molded body which contacts the embedded stator and forms a tightly conforming interface with the stator.

In general, the injection-molding process involves the steps of: (a) feeding the polymer composition into a heating chamber of a molding machine and heating the composition to form a molten composition (liquid plastic); b) injecting the molten composition into the mold; c) maintaining the composition in the mold under high pressure until it cools; and d) removing the molded member.

The thermally-conductive housing for the stator of the present invention has many advantageous features over conventional assemblies including the following. First, the housing comprises a polymer composition that uniformly encapsulates and balances the stator, thus helping to dampen any vibration caused by the operation of the motor.

Secondly, the housing has improved thermal conductivity properties. Preferably, the housing has a thermal conductivity of at least about 1 W/m° K. Referring to FIG. 1, these heat transfer properties allow the housing 28 to remove heat from the stator assembly 10, wherein heat generated from the operation of the motor can build up quickly. The molded housing efficiently dissipates the heat and prevents overheating of the motor. In this manner, the molded housing acts as a heat sink.

Third, the injection-molding process is effective, because it can produce a "net-shape molded" housing which encapsulates the stator. By "net-shape molded", it is meant that the final shape of the housing is determined by the shape of the mold. No further processing, die-cutting, machining, or other tooling is required to produce the final shape of the housing.

It is appreciated by those skilled in the art that various changes and modifications can be made to the description and illustrated embodiments herein without departing from the spirit of the present invention. All such modifications and changes are intended to be covered by the appended claims.

What is claimed is:

1. A method for making a balanced stator assembly having a high density thermally-conductive housing, comprising the steps of:
   providing a weight balanced molten polymer composition of about 20% to about 80% by weight of a base polymer matrix and about 30% to about 80% by weight of a thermally-conductive, electrically-insulating material and a total polymer composition density of greater than 2.5 g/cc and a total electrical resistivity kept at $1 \times 10^{12}$ ohm-cm or greater;
   providing a motor stator comprising a magnetically-inducible non-uniform core with poles extending therefrom, wherein the poles have wire windings for conducting electrical current said wire winding having a wire density; and
   injecting the molten polymer composition into a mold containing the stator and maintaining the composition under high pressure until it cools to form a stator assembly having a thermally-conductive housing, wherein said housing overcomes imbalances in said stator created by the non-uniformity of said core wherein a density differential between said polymer composition and said wire density is less than 6.4 g/cc, and wherein the composition has a thermal conductivity of at least about 0.6 W/m° K.

2. The method of claim 1, wherein the polymer matrix comprises a thermoplastic polymer.

3. The method of claim 2, wherein the polymer is selected from the group consisting of polycarbonates, polyethylene, polypropylene, acrylics, vinyls, fluoropolymers, polyamides, polyesters, polysulfones, polyphenylene sulfide, liquid crystal polymers, polyetherimide, and polyamidimide, and blends thereof.

4. The method of claim 3, wherein the thermoplastic polymer is polyphenylene sulfide.

5. The method of claim 3, wherein the thermoplastic polymer is an injection-moldable fluoropolymer.

6. The method of claim 1, wherein the polymer matrix comprises a thermosetting polymer.

7. The method of claim 1, wherein the composition further comprises a reinforcing material to strengthen the polymer matrix.

8. The method of claim 1, wherein the composition comprises about 30 weight % polyphenylene sulfide, about 60 weight % zinc oxide particles, and about 10 weight % reinforcing chopped glass.

9. The method of claim 1, wherein the composition comprises about 30 weight % polyphenylene sulfide, and about 70 weight % zinc oxide particles.

* * * * *